US011236792B2

(12) United States Patent
Kang et al.

(10) Patent No.: US 11,236,792 B2
(45) Date of Patent: Feb. 1, 2022

(54) LEAF SPRING ASSEMBLY FOR AUTOMOBILE STORAGE BODY

(71) Applicant: NIFCO KOREA INC., Asan-si (KR)

(72) Inventors: Young Gu Kang, Chungcheongnam-do (KR); Sung Ho Park, Chungcheongnam-do (KR); Yong Dae Kim, Chungcheongnam-do (KR)

(73) Assignee: NIFCO KOREA INC., Chungcheongnam-do (KR)

( * ) Notice: Subject to any disclaimer, the term of this patent is extended or adjusted under 35 U.S.C. 154(b) by 0 days.

(21) Appl. No.: 16/347,486

(22) PCT Filed: Aug. 24, 2017

(86) PCT No.: PCT/KR2017/009236
§ 371 (c)(1),
(2) Date: May 3, 2019

(87) PCT Pub. No.: WO2018/093017
PCT Pub. Date: May 24, 2018

(65) Prior Publication Data
US 2020/0056672 A1 Feb. 20, 2020

(30) Foreign Application Priority Data

Nov. 16, 2016 (KR) .......................... 10-2016-0152688

(51) Int. Cl.
*F16F 1/26* (2006.01)
*B60N 3/10* (2006.01)
(52) U.S. Cl.
CPC ................ *F16F 1/26* (2013.01); *B60N 3/102* (2013.01)

(58) Field of Classification Search
CPC .................................. F16F 1/26; B60N 3/102
See application file for complete search history.

(56) References Cited

U.S. PATENT DOCUMENTS 3,233,858 A * 2/1966 Benjamin .............. B60N 3/102
248/311.2
6,076,793 A * 6/2000 Yamamoto ............. B60N 3/102
224/926
(Continued)

FOREIGN PATENT DOCUMENTS

CN        203496727 U      3/2014
CN        203713649 U      7/2014
(Continued)

OTHER PUBLICATIONS

International Search Report for PCT/KR2017/009236 dated Nov. 15, 2017.
(Continued)

*Primary Examiner* — Melody M Burch
(74) *Attorney, Agent, or Firm* — Thomas Horstemeyer, LLP

(57) ABSTRACT

A leaf spring assembly for an automobile storage compartment has a hook, a leaf spring, and a spring guide. The hook is coupled to an operating plate. One end portion of the leaf spring is fixedly coupled to the hook. The spring guide is fixedly coupled to a non-operating housing in the state where the other side portion of the leaf spring is coupled to the spring guide so as to elastically deform while being drawn in and out.

3 Claims, 6 Drawing Sheets

(56) References Cited

U.S. PATENT DOCUMENTS

| | | | | |
|---|---|---|---|---|
| 6,485,097 B1* | 11/2002 | Yuzawa | ................ | B60N 3/102 |
| | | | | 297/188.01 |
| 7,497,410 B2 | 3/2009 | Lee | | |
| 2002/0179660 A1* | 12/2002 | Schaal | ................ | B60N 3/083 |
| | | | | 224/282 |
| 2008/0067820 A1* | 3/2008 | Huang | ................ | E05B 15/02 |
| | | | | 292/347 |

FOREIGN PATENT DOCUMENTS

| | | |
|---|---|---|
| CN | 205131026 U | 4/2016 |
| KR | 10-0526896 B1 | 11/2005 |
| KR | 10-0553091 B1 | 2/2006 |
| KR | 10-2007-0042311 A | 4/2007 |
| KR | 10-0846898 B1 | 7/2008 |
| KR | 20-0450811 Y1 | 11/2010 |
| KR | 10-1559259 B1 | 10/2015 |

OTHER PUBLICATIONS

Office Action issued in Chinese application No. 20 1780070118.3 dated Nov. 27, 2020.
Second Office Action dated Jul. 14, 2021 for Chinese Patent Application No. 201780070118.3.

* cited by examiner

LEAF SPRING ASSEMBLY FOR AUTOMOBILE STORAGE BODY

CROSS-REFERENCE TO RELATED APPLICATIONS

This application is the 35 U.S.C. § 371 national stage application of, and claims priority to, PCT Application No. PCT/KR2017/009236, filed Aug. 24, 2017, and entitled "LEAF SPRING ASSEMBLY FOR AUTOMOBILE STORAGE BODY" which claims priority to Korean Patent Application No. 10-2016-0152688, filed Nov. 16, 2016, and entitled "A PLATE SPRING ASSEMBLY FOR DEPOSIT BOX IN VEHICLES," which are herein incorporated by reference in their entirety.

TECHNICAL FIELD

The present disclosure relates to a leaf spring assembly for an automobile storage compartment which can elastically support objects by means of an elastic force of a leaf spring. More particularly, the present disclosure relates to a leaf spring assembly for an automobile storage compartment, which does not generate abnormal sound caused by friction during operation by stretching or restoring a leaf spring, and which suppresses the generation of abnormal sound caused due to bending of the leaf spring by imparting leftward and rightward freedom to the leaf spring so as to make a reference operating direction and an actual operating direction coincide with each other during operation.

BACKGROUND

A leaf spring assembly, to which the present disclosure relates, can elastically support objects by means of an elastic force of a leaf spring. FIGS. 1 to 3 show a vehicle cup holder, to which the leaf spring assembly is mounted.

In the vehicle cup holder shown in FIGS. 1 and 3, a winding reel 31 configured to wind or unwind a leaf spring 32 is rotatably supported on a front cover 20 which is installed in a housing 10 so as to be drawn out. One end of the leaf spring 32 is connected to the housing 10. As the front cover 20 is unlocked, the front cover 20 is automatically opened by a restoring force of the leaf spring 32. Further, as the front cover 20 is closed, the leaf spring 32 is rewound around the winding reel 31.

FIG. 4 shows a plan view of such a prior art leaf spring assembly 30.

As shown in FIG. 4, the prior art spring assembly 30 includes: a winding reel 31 whose hinge protrusions 31a are rotatably mounted to a non-operating housing 10; a leaf spring 32 whose one end portion is connected to the winding reel 31; and a hook 33 coupled to an operating plate in the state where the other end portion of the leaf spring 32 is fixedly coupled to one end portion of the hook.

In the aforementioned leaf spring assembly 30, as the operating plate and the hook 33 are drawn out by an external force, the winding reel 31 is rotated in one direction about the hinge protrusions 31a and, at the same time, the wound leaf spring 32 is unwound. As the external force is removed from the operating plate and the hook 33, the drawn-out leaf spring 32 is rewound around the winding reel 31 and, at the same time, the operating plate and the hook 33 are returned to their original positions while the winding reel 31 is rotated about the hinge protrusions 31a in the other direction by an elastic restoring force.

However, the aforementioned spring assembly 30 of a prior art may be problematic. The hinge protrusions 31a are rotatably coupled to the non-operating housing 10, as shown in FIG. 4. Thus, friction is generated in the winding reel 31 which provides an elastic force as one side portion of the leaf spring 32 is wound or unwound, thus generating abnormal sound. Further, as the leaf spring is wound and then unwound, a bending phenomenon occurs and abnormal operating sound is generated thereby.

Further, in the prior art, as shown in FIG. 5, the hinge protrusions 31a of the winding reel 31 are coupled to the non-operating housing 10 so as to generate shaking. Therefore, in the leaf spring 32 which is repeatedly wound on and unwound from the winding reel 31, a reference operating direction (A) and an actual operating direction (B) do not coincide with each other. Thus, cracks are generated due to internal stresses, and durability decreases thereby.

PRIOR ART DOCUMENT

Patent Document (Patent Document 1) Korean Utility Model Registration Publication No. 20-0450811 (registered on Oct. 27, 2010)

SUMMARY

The present disclosure has been made to solve the aforementioned problems of the prior art. The present disclosure provides a leaf spring assembly for an automobile storage compartment, which, by fixedly coupling a spring guide to a non-operating housing, does not generate shaking when a leaf spring is drawn in and out through a spring-drawing guiding portion formed in the spring guide, and which does not generate friction sound caused by a spring force of the leaf spring by reducing a frictional force generated in the leaf spring while an outer surface of the leaf spring comes into contact with a spring contact portion when the leaf spring is drawn into the spring guide through the spring-drawing guiding portion.

A further object of the present disclosure is to provide a leaf spring assembly for an automobile storage compartment, which does not generate bending phenomenon and abnormal sound when the leaf spring is operated so as to be drawn inwardly of the spring guide and outwardly of the spring guide, and which improves the durability of the leaf spring. In this regard, the leaf spring is smoothly draw in and out in the state where a hook, to which one end portion of the leaf spring is coupled, is rotated and coincide with the center of the spring guide when the leaf spring is drawn inwardly and outwardly of the spring guide through the spring-drawing guiding portion.

Another object of the present disclosure is to provide a leaf spring assembly for an automobile storage compartment, in which the leaf spring can be operated up to its maximum force value by minimizing the distance between the center of the spring guide and the center of the hook.

In order to achieve the objects of the present disclosure, a leaf spring assembly for an automobile storage compartment according to the present disclosure comprises: a hook 300 coupled to an operating plate; a leaf spring 200 whose one end portion is fixedly coupled to the hook 300; and a spring guide 100 fixedly coupled to a non-operating housing in the state where the other side portion of the leaf spring 200 is coupled to the spring guide so as to elastically deform while being drawn in and out.

Further, a spring contact portion 110, with which an outer surface of the leaf spring 200 is in contact, is formed in the spring guide 100, to which the other side portion of the leaf spring 200 is coupled, and is curvedly bent. A spring-drawing guiding portion 120 is formed at the top of the spring contact portion 110 and allows the leaf spring 200 to be drawn out while being guided. Rectangular mounting protrusions 130 are protrudingly formed in front and rear outer surfaces of the spring guide 100, respectively, and are fixedly inserted and coupled to the non-operating housing. Thus, the mounting protrusions 130 of the spring guide 100 are fixedly coupled to the non-operating housing in the state where the mounting protrusions are formed in a rectangular shape, and the leaf spring is drawn in and out through the spring-drawing guiding portion portion 120 in the state where one side surface of the other side portion of the leaf spring 200 is in close contact with the spring contact portion 110 of the spring guide 100.

Further, the hook 300, to which the one end portion of the leaf spring 200 is coupled, comprises an upper cover 310 and a lower cover 320. A drawing-in hole 311, into which the one end portion of the leaf spring 200 is drawn, is formed through the upper cover, and coupling protrusions 313, which are rotatably coupled to the operating plate, are outwardly protrudingly formed in left and right outer surfaces of the upper cover, respectively. An insertion protrusion 321 is protrudingly formed at the top of the lower cover and is inserted to and passes through the leaf spring 200 which is drawn into the drawing-in hole 311 formed in the upper cover 310. Thus, the insertion protrusion 321 formed in the lower cover 320 is inserted so as to pass through the leaf spring 200 in the state where the one end portion of the leaf spring 200 is drawn into the drawing-in hole 311 formed in the upper cover 310, thus fixedly coupling the hook 300 to the one end portion of the leaf spring 200.

Further, a coupling hole 312, whose inner diameter is equal to the insertion protrusion 321 formed in the lower cover 320, is formed through the upper cover 310, and a passing hole 210, which has an inner diameter equal to the coupling hole 312, is formed through the one end portion of the leaf spring 200 which is inserted through the drawing-in hole 311. Thus, the insertion protrusion 321 formed in the lower cover 320 is inserted into the coupling hole 312 in the state where the one end portion of the leaf spring 200 is drawn such that both the center of the passing hole 210 formed in the leaf spring 200 and the center of the coupling hole 312 formed in the upper cover 310 coincide with each other. Therefore, the one end portion of the leaf spring 200 is drawn into the drawing-in hole 311 and is fixed to the upper cover 310, thus maintaining the firmly coupled state of the one end portion of the leaf spring.

According to the present disclosure, since the spring guide is fixedly coupled to the non-operating housing, shaking does not occur. In addition, since the outer surface of the leaf spring is in contact with the spring contact portion when the leaf spring is drawn into the spring guide through the spring-drawing guiding portion, the frictional force generated in the leaf spring is reduced. Thus, both abnormal operating sound and friction sound caused due to the spring force are not generated.

Further, according to the present disclosure, when the leaf spring is drawn inwardly and outwardly of the spring guide through the spring-drawing guiding portion, the leaf spring is smoothly drawn in and out in the state where the hook, to which one end portion of the leaf spring is coupled, is rotated and coincides with the center of the spring guide. Thus, both bending phenomenon and abnormal sound are not generated when the leaf spring is operated to be drawn inwardly and outwardly of the spring guide, and the durability of the leaf spring is improved.

Further, according to the present distance, since the distance between the center of the spring guide and the center of the hook is minimized, the leaf spring can be operated up to its maximum force value.

DETAILED DESCRIPTION

Descriptions are made hereinbelow in detail as to a technical configuration of the present disclosure with reference to the accompanying drawings.

Figure 1:
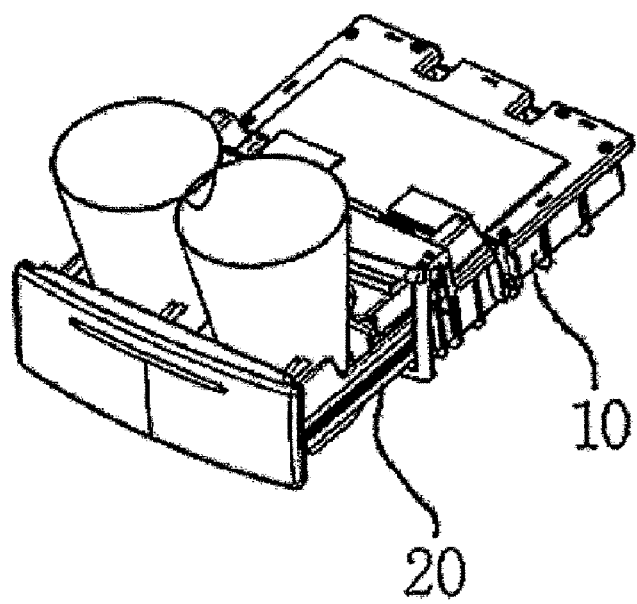
FIG. 1 is a perspective view of a vehicle cup holder to which a leaf spring assembly related to the present disclosure is mounted.
Figure 2:
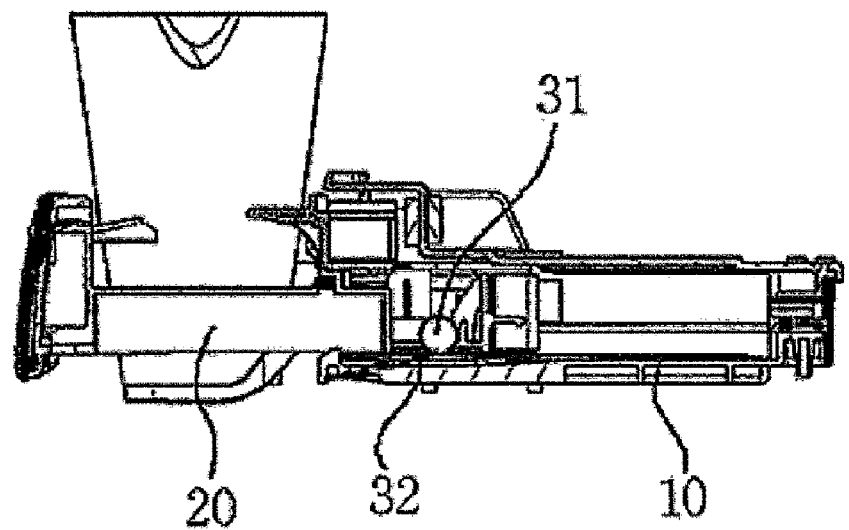
FIG. 2 is a longitudinal sectional view of the vehicle cup holder.
Figure 3:
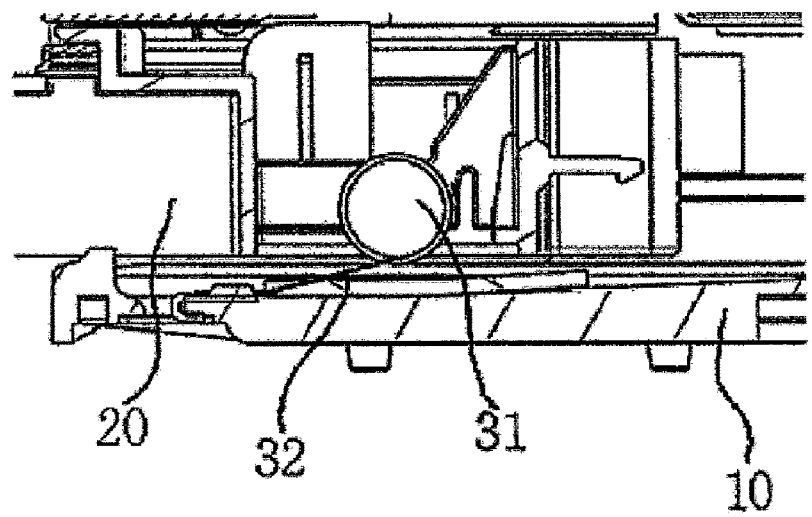
FIG. 3 is an enlarged view of the main part of the vehicle cup holder.
Figure 4:
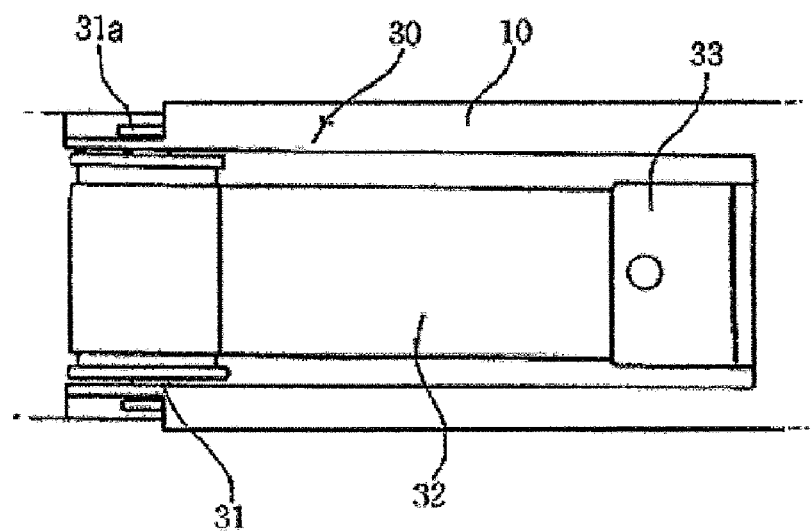
FIG. 4 is a plan view showing the use state of a leaf spring assembly of a prior art.
Figure 5:
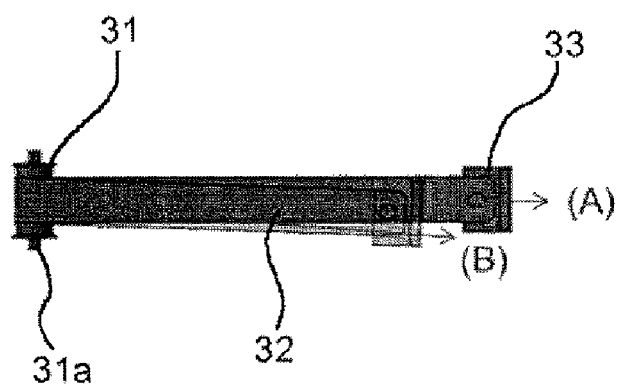
FIG. 5 is a plan view showing a leaf spring assembly of a prior art.
Figure 6:
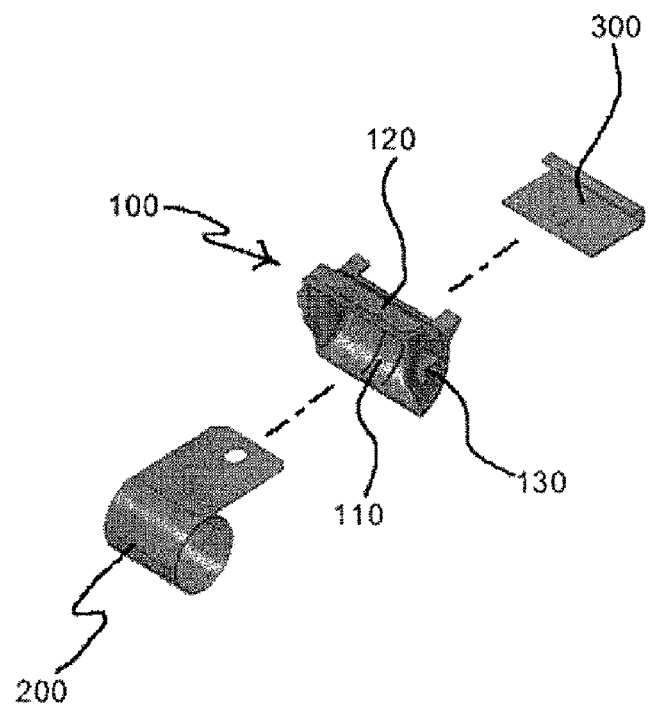
FIG. 6 is an exploded perspective view of a leaf spring assembly according to the present disclosure.
Figure 7:
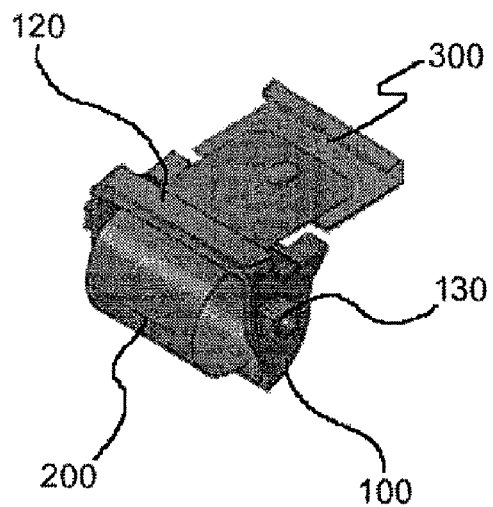
FIG. 7 is an assembled perspective view of a leaf spring assembly according to the present disclosure.
Figure 8:
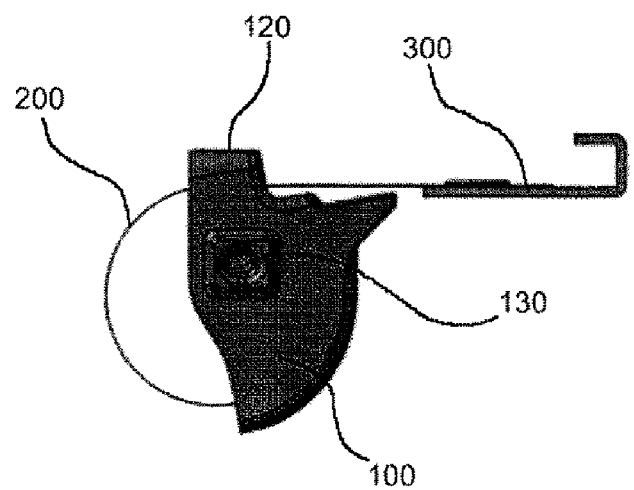
FIG. 8 is a front view showing the assembled state of a leaf spring assembly according to the present disclosure.
Figure 9:
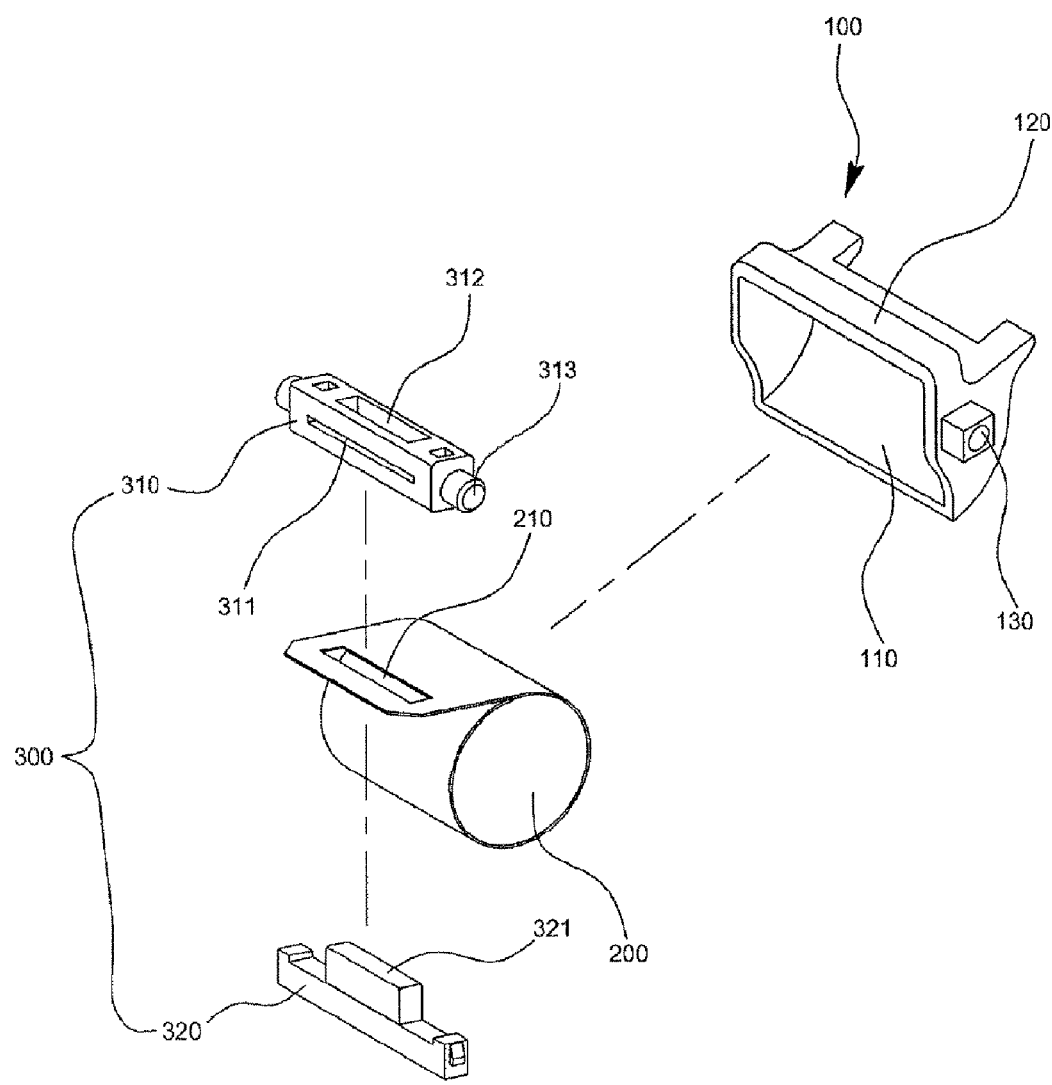
FIG. 9 is an exploded perspective view showing one embodiment of a leaf spring assembly according to the present disclosure.

FIG. 6 is an exploded perspective view of a leaf spring assembly according to the present disclosure. FIG. 7 is an assembled perspective view of a leaf spring assembly according to the present disclosure. FIG. 8 is a front view showing the assembled state of a leaf spring assembly according to the present disclosure. FIG. 9 is an exploded perspective view showing one embodiment of a leaf spring assembly according to the present disclosure.

Referring to FIGS. 6 to 8, the leaf spring assembly for an automobile storage compartment according to the present disclosure comprises: a hook 300 coupled to an operating plate; a leaf spring 200 whose one end portion is fixedly coupled to the hook 300; and a spring guide 100 fixedly coupled to a housing, which is a non-operating part, in the state where the other side portion of the leaf spring 200 is coupled to the spring guide so as to elastically deform while being drawn in and out.

The other side portion of the leaf spring 200 is coupled to the spring guide 100. A spring contact portion 110, with which an outer surface of the leaf spring 200 comes into contact, is formed in the spring guide and is curvedly bent. A spring-drawing guiding portion 120 is formed at the top of the spring contact portion 110 and allows the leaf spring 200 to be drawn out while being guided. Rectangular mounting protrusions 130 are protrudingly formed in front and rear outer surfaces of the spring guide 100, respectively, and are fixedly inserted and coupled to the non-operating housing.

Further, as shown in FIG. 9, the hook 300, to which the one end portion of the leaf spring 200 is coupled, comprises an upper cover 310 and a lower cover 320. A drawing-in hole 311, into which the one end portion of the leaf spring 200 is drawn, is formed through the upper cover, and coupling protrusions 313, which are rotatably coupled to the operating plate, are outwardly protrudingly formed in left and right outer surfaces of the upper cover, respectively. An insertion protrusion 321 is protrudingly formed at the top of the lower cover and is inserted to and passes through the leaf spring 200 which is drawn into the drawing-in hole 311 formed in the upper cover 310.

Further, a coupling hole 312, whose inner diameter is equal to the insertion protrusion 321 formed in the lower cover 320, is formed through the upper cover 310, and a passing hole 210, which has an inner diameter equal to the coupling hole 312, is formed through the one end portion of the leaf spring 200 which is to be inserted through the drawing-in hole 311.

Assembling the leaf spring assembly according to the present disclosure, which is configured as described above, is completed by coupling the hook 300, which is to be coupled to the operating plate, to the one end portion of the leaf spring 200, and then coupling the other side portion of the leaf spring 200, whose one end portion is coupled to the hook 300, to the spring guide 100.

At this time, the one end portion of the leaf spring 200, through which the passing hole 210 is formed, is drawn through the drawing-in hole 311 formed in the upper cover 310 such that the inner diameter of the passing hole coincides with the center of the coupling hole 312. After the one end portion of the leaf spring 200 is drawn through the drawing-in hole 311, the insertion protrusion 321 formed in the lower cover 320 is inserted to and passes through both the coupling hole 312 of the upper cover 310 and the passing hole 210, thus fixing the hook 300 and maintaining the state where the hook 300 is coupled to the one end portion of the leaf spring 200.

Further, the other side portion of the leaf spring 200 is coupled to the spring guide 100 such that the leaf spring is drawn in and out through the spring-drawing guiding portion 120 in the state where the outer surface of the leaf spring 200 is in contact with the spring contact portion 110 formed to be curvedly bent.

Assembling the leaf spring assembly may be performed by first seating the other side portion of the leaf spring 200 such that the outer surface of the leaf spring comes into contact with the spring contact portion 110 of the spring guide 100, and then by coupling the hook 300, which is to be coupled to the operating plate, to the one end portion of the leaf spring 200 whose other side portion is seated in the state where the outer surface of the leaf spring is in contact with the spring contact portion 110.

After the leaf spring assembly is assembled as described above, the hook 300, to which the one end portion of the leaf spring 200 is coupled, is fixedly coupled to the operating plate, and then the rectangular mounting protrusions 130, which are protrudingly formed in the front and rear outer surfaces of the spring guide 100 to which the other side portion of the leaf spring 200 is coupled, are fixed inserted to and coupled to the non-operating housing.

At this time, the coupling protrusions 313 formed in the upper cover 310 of the hook 300 are rotatably coupled to the operating plate. When the installation position of the hook 300 coupled to the operating plate is higher or lower than the installation position of the spring guide 100 installed to the housing, the hook is rotated so as to coincide with the operating direction of the leaf spring 200.

Therefore, in case where the operating plate inserted into the non-operating housing is to be drawn out for its use, as the leaf spring 200 is drawn out while being guided through the spring-drawing guiding portion 120 formed in the spring guide 100 installed to the housing, the hook 300 is rotated about the coupling protrusions 313 so as to coincide with the operating direction of the leaf spring 200. Thus, the operating plate is smoothly drawn out from the housing without occurrence of the bending phenomenon of the leaf spring 200 and the abnormal sound.

Further, in case where the operating plate drawn out from the non-operating housing is to be drawn in, the operating plate is smoothly drawn into the housing as the leaf spring 200 is drawn in while being guided through the spring-drawing guiding portion 120 formed in the spring guide 100.

The leaf spring 200 is drawn inwardly and outwardly of the spring guide 100 while being guided through the spring-drawing guiding portion 120 according to the drawn-in or drawn-out state of the operating plate in the state where the outer surface of the leaf spring is in contact with the spring contact portion 110 of the spring guide 100. Also, at the same time, the hook 300 is rotated so as to coincide with the operating direction of the leaf spring 200. Thus, when the leaf spring 200 is operated, bending and abnormal sound, which are caused due to the noncoincidence with the operating direction, are not generated. Further, stresses applied to the leaf spring 200 is minimized, thus improving the durability of the leaf spring.

Further, when the leaf spring 200 is drawn inwardly and outwardly of the spring guide 100 through the spring-drawing guiding portion 120, the distance between the center of the mounting protrusion 130 of the spring guide 100 fixedly inserted into the housing and the center of the coupling protrusion 313 of the hook 300 is minimized. Thus, the leaf spring 200 can be used up to its maximum force value. Furthermore, the rectangular mounting protrusions 130 protrudingly formed in the front and rear outer surfaces of the spring guide 100 are fixedly inserted to the housing. Thus, due to the elastic force of the leaf spring 200, shaking is not generated and abnormal operation sound is not generated thereby.

[Description of Reference Numerals]

| | |
|---|---|
| 100: spring guide | 110: spring contact portion |
| 120: spring-drawing guiding portion | 130: mounting protrusion |
| 200: leaf spring | 210: passing hole |
| 300: hook | 310: upper cover |
| 311: drawing-in hole | 312: coupling hole |
| 313: coupling protrusion | 320: lower cover |
| 321: insertion protrusion | |

What is claimed is:

1. A leaf spring assembly for an automobile storage compartment, the leaf spring assembly comprising:
    a hook coupled to an operating plate;
    a leaf spring whose one end portion is fixedly coupled to the hook; and
    a spring guide fixedly coupled to a non-operating housing in a state where the other end portion of the leaf spring is coupled to the spring guide so as to elastically deform while being drawn in and out,
    wherein the hook, to which the one end portion of the leaf spring is coupled, comprises an upper cover and a lower cover,
    wherein a drawing-in hole, into which the one end portion of the leaf spring is drawn, is formed through the upper cover, and coupling protrusions, which are rotatably coupled to the operating plate, are outwardly protrudingly formed in left and right outer surfaces of the upper cover, respectively, and wherein an insertion protrusion is protrudingly formed at a top of the lower cover and is inserted to and passes through the leaf spring which is drawn into the drawing-in hole formed in the upper cover.

2. The leaf spring assembly of claim 1, wherein a coupling hole, whose inner diameter is equal to the insertion protrusion formed in the lower cover, is formed through the upper cover, and wherein a passing hole, which has an inner diameter equal to the coupling hole, is formed through the one end portion of the leaf spring which is inserted through the drawing-in hole.

3. The leaf spring assembly of claim 1, wherein the other end portion of the leaf spring is coupled to the spring guide, wherein a spring contact portion, with which an outer surface of the leaf spring is in contact, is formed in the spring guide and is curvedly bent, wherein a spring-drawing guiding portion is formed at a top of the spring contact portion and allows the leaf spring to be drawn out while being guided, and wherein rectangular mounting protrusions are protrudingly formed in front and rear outer surfaces of the spring guide, respectively, and are fixedly inserted and coupled to the non-operating housing.

* * * * *